(12) United States Patent
Watanabe

(10) Patent No.: US 8,832,477 B2
(45) Date of Patent: Sep. 9, 2014

(54) ELECTRONIC APPARATUS AND SIGNAL DISCONNECTION/CONNECTION METHOD

(75) Inventor: Kenichi Watanabe, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 568 days.

(21) Appl. No.: 12/627,418

(22) Filed: Nov. 30, 2009

(65) Prior Publication Data

US 2010/0138574 A1 Jun. 3, 2010

(30) Foreign Application Priority Data

Dec. 1, 2008 (JP) .................................. 2008-306439
Nov. 9, 2009 (JP) .................................. 2009-256375

(51) Int. Cl.
G06F 1/26 (2006.01)

(52) U.S. Cl.
USPC .......................................... 713/320; 713/324

(58) Field of Classification Search
USPC .................................. 713/310, 320, 323, 324
See application file for complete search history.

(56) References Cited

U.S. PATENT DOCUMENTS

| | | | | | |
|---|---|---|---|---|---|
| 4,593,323 | A | * | 6/1986 | Kanda et al. ............. | 379/100.01 |
| 4,924,494 | A | * | 5/1990 | Shung ....................... | 379/100.12 |
| 4,985,830 | A | * | 1/1991 | Atac et al. ...................... | 709/239 |
| 5,167,028 | A | * | 11/1992 | Shires ........................... | 711/147 |
| 5,420,667 | A | * | 5/1995 | Kaneko et al. ..................... | 399/8 |
| 5,933,581 | A | * | 8/1999 | Miyazaki et al. ............. | 358/1.14 |
| 6,061,754 | A | * | 5/2000 | Cepulis et al. ................ | 710/312 |
| 6,112,269 | A | * | 8/2000 | Nordling .......................... | 710/69 |
| 6,230,229 | B1 | * | 5/2001 | Van Krevelen et al. ........ | 710/317 |
| 6,725,320 | B1 | * | 4/2004 | Barenys et al. ................ | 710/316 |
| 7,372,301 | B2 | * | 5/2008 | Fukuoka et al. ................ | 326/81 |
| 7,962,680 | B2 | * | 6/2011 | Fukunaga ..................... | 710/300 |
| 2003/0014677 | A1 | * | 1/2003 | Howard et al. ............... | 713/323 |
| 2005/0108584 | A1 | * | 5/2005 | Kawakami et al. ........... | 713/300 |
| 2009/0119525 | A1 | * | 5/2009 | Morimoto et al. ............ | 713/323 |

FOREIGN PATENT DOCUMENTS

| | | |
|---|---|---|
| JP | 2006-350800 A | 12/2006 |
| JP | 2007-306143 | 11/2007 |
| JP | 2008-72494 | 3/2008 |
| JP | 2008-234073 | 10/2008 |

OTHER PUBLICATIONS

Definition of "Realy", <http://en.wikipedia.org/wiki/Relay>, accessed Aug. 16, 2011.*
Japanese Office Action issued Sep. 3, 2013, in Japan Patent Application No. 2009-256375.
Japanese Office Action issued May 20, 2014, in Japanese Patent Application No. 2009-256375.

* cited by examiner

*Primary Examiner* — Khanh Dang
(74) *Attorney, Agent, or Firm* — Oblon, Spivak, McClelland, Maier & Neustadt, L.L.P.

(57) ABSTRACT

An electronic apparatus includes a first board that includes a first processor, a second board that is connected to the first board with a bus and that includes a second processor, and a disconnecting/connecting unit that, when the first board is in a first state in which power of the first processor is turned off and the second board is in a second state in which power of the second processor is turned on, disconnects a signal supplied via the bus between the first board and the second board.

10 Claims, 9 Drawing Sheets

ELECTRONIC APPARATUS AND SIGNAL DISCONNECTION/CONNECTION METHOD

CROSS-REFERENCE TO RELATED APPLICATIONS

The present application claims priority to and incorporates by reference the entire contents of Japanese Patent Application No. 2008-306439 filed in Japan on Dec. 1, 2008 and Japanese Patent Application No. 2009-256375 filed in Japan on Nov. 9, 2009.

BACKGROUND OF THE INVENTION

1. Field of the Invention

The present invention relates to an electronic apparatus and a signal disconnection/connection method.

2. Description of the Related Art

Multifunction products that have a copy function, a FAX function, a print function, a scanner function, and the like have been often used in recent years. It has been known that, in such multifunction products, the power for unnecessary functions is turned off during the energy-saving mode so that the power saving of the system is achieved.

For example, Japanese Patent Application Laid-open No. 2003-234073 discloses an image processing apparatus that includes an engine control unit including a scanner control unit and a plotter control unit, a controller control unit that controls the entire apparatus, and a power supply unit (PSU) that controls the power supply to these units and in which the controller control unit and the engine control unit are connected to each other via a PCI bus and a FAX board can be connected to the PCI bus as an option.

The image processing apparatus has a stand-by mode, an engine-off mode, and a Suspend-To-RAM mode (STR) as energy-saving modes. The stand-by mode is a state in which the power of both the engine control unit and the controller control unit is turned on and is a mode that allows each operation (copy operation, scanner operation, and print operation) to be performed immediately. The engine-off mode is a state in which the power of the engine control unit is turned off and the power of the controller control unit is turned on and is a mode that allows communication such as a status notification to be performed between the image processing apparatus and an external device. The STR mode is a mode in which the power of the engine control unit is turned off and the power of the controller control unit is turned off except for some ICs thereof (the CPU is turned off).

In the image processing apparatus, the FAX board connected to the PCI bus as an option detects a ringing signal from a phone line so that it can perform a FAX communication with a caller. At that time, a binary signal is generated from the received ringing signal and, if its frequency falls within a detection range of a ringing frequency, it is recognized as a ringing signal.

A binary signal is generated in accordance with the rise/fall change of a ringing signal and, if the ringing signal is a sine wave, a clear binary signal is generated as shown in FIG. 13 and its frequency can be accurately measured. However, switching devices that output various ringing signals are available in the market, and some switching devices output a ringing signal with part of the waveform distorted, as shown in FIG. 14.

When the ringing signal output from the switching device is detected, a binary signal is split in accordance with the rise-fall-rise change of the distorted part. The frequencies of two binary signals on the positive and negative sides are concurrently measured so that, even if the waveform on one side is split as shown in FIG. 14, the frequency can be measured accurately by using the binary signal on the other side. However, for example, if both of the two binary signals are split as shown in FIG. 15, the frequency cannot be measured accurately using any of the binary signals; therefore, such a case can be resolved only by expanding the frequency detection range (for example, the upper limit frequency is increased up to 100 Hz).

If the CPU of the FAX board is turned on, the frequency detection range is expanded by software so that the frequency can be measured accurately even in the case shown in FIG. 15. However, if the CPU of the FAX board is turned off during the STR mode, the detection frequency cannot be controlled by software and the detection frequency depends on the capability of a device that detects a ringing signal from the phone line. Therefore, there is a possibility that the frequency of the binary signal does not fall within the detection frequency range. In this case, there is a possibility that the ringing signal is not recognized and a FAX communication with the caller cannot be performed. To prevent this situation, the CPU of the FAX board cannot be turned off even during the STR mode.

However, if the power of the FAX board is turned on during the STR mode, because the FAX board is connected to the controller control unit via the PCI bus, the current passes through the PCI bus and flows into the controller control unit from the FAX board, which can significantly affect the IC of the controller control unit.

Therefore, if the FAX board is connected, the controller control unit cannot shift to the STR mode. Thus, there is a problem in that the power consumption is increased (from 2.1 Wh to 16.1 Wh) because the FAX board is connected.

SUMMARY OF THE INVENTION

It is an object of the present invention to at least partially solve the problems in the conventional technology.

According to one aspect of the present invention, there is provided an electronic apparatus including: a first board that includes a first processor; a second board that is connected to the first board with a bus, the second board including a second processor; and a disconnecting/connecting unit that, when the first board is in a first state in which power of the first processor is turned off and the second board is in a second state in which power of the second processor is turned on, disconnects a signal supplied via the bus between the first board and the second board.

Furthermore, according to another aspect of the present invention, there is provided a method of disconnecting and connecting a signal in an electronic apparatus that includes a first board that includes a first processor and a second board that is connected to the first board with a bus and that includes a second processor. The method includes disconnecting/connecting including, when the first board is in a first state in which power of the first processor is turned off and the second board is in a second state in which power of the second processor is turned on, disconnecting a signal supplied via the bus between the first board and the second board.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an electronic apparatus and a signal disconnection/connection method according to the present invention are explained in detail below with reference to the accompanying drawings.

Figure 1:
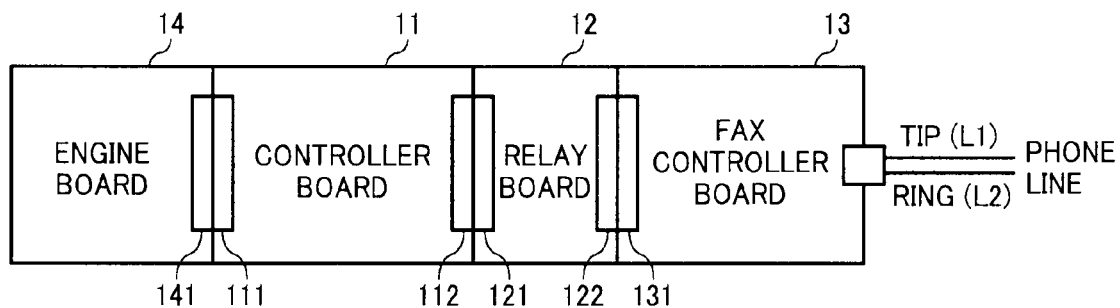
FIG. 1 is a diagram illustrating boards that constitute an image forming apparatus according to a first embodiment of the present invention.

FIG. 1 is a diagram that illustrates boards that constitute an image forming apparatus that is an electronic apparatus according to a first embodiment of the present invention. The image forming apparatus includes a controller board 11, a relay board 12, a FAX controller board 13, and an engine board 14.

The controller board 11 is a board on which a controller that controls the entire image forming apparatus is mounted, the engine board 14 is a board on which a section that controls an image engine is mounted, and the FAX controller board 13 is an interface unit for a phone line in the image forming apparatus and a board on which a section that controls a FAX function is mounted. The relay board 12 is a board that connects the FAX controller board 13, which is an option, to the controller board 11 to relay the transmission of signals via a PCI bus.

The controller board 11 includes connectors 111 and 112 of the PCI bus so that the connector 111 is connected to a connector 141 of the engine board 14 and the connector 112 is connected to a connector 121 of the relay board 12 directly or via a cable. A connector 122 of the relay board 12 is connected to a connector 131 of the FAX controller board 13 directly or via a cable.

Figure 2:
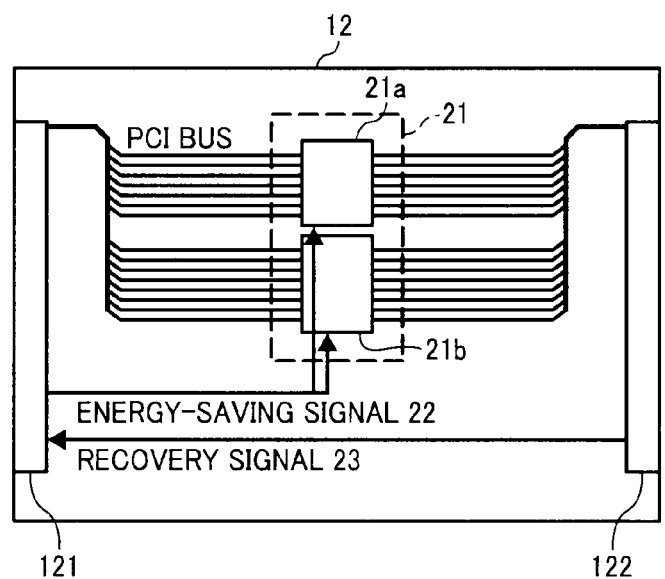
FIG. 2 is a diagram illustrating the outline of a circuit on a relay board.

FIG. 2 is a diagram that illustrates the outline of a circuit on the relay board 12. The data path between the connector 121 and the connector 122 is connected via the PCI bus. Furthermore, a disconnecting/connecting unit 21 is arranged on the PCI bus. The disconnecting/connecting unit 21 is constituted by bus switches 21a, 21b. The bus switches 21a, 21b are turned on/off so that the data path between the connector 121 and the connector 122 can be disconnected/connected. Specifically, the bus switches are turned on/off so that signals flowing via the PCI bus between the connector 121 and the connector 122 are interrupted or passed through. The bus switches 21a, 21b are set to be on or off in accordance with the level (high/low) of an energy-saving signal 22 (the details will be described later) fed from the controller board 11.

Figure 3:
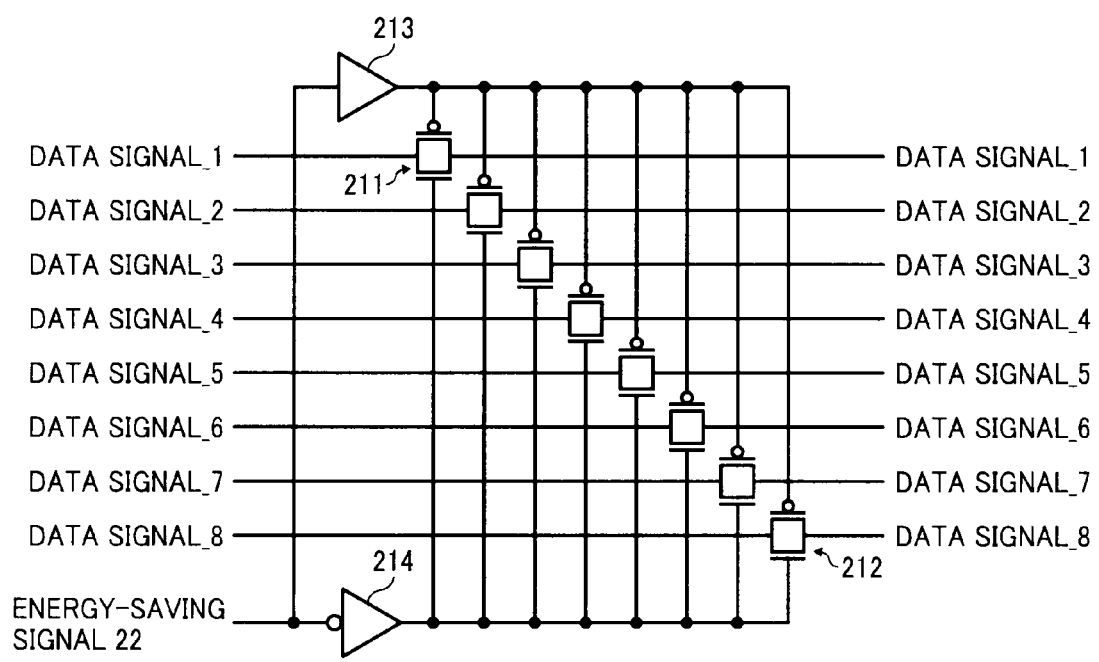
FIG. 3 is a diagram illustrating a circuit configuration of bus switches.

FIG. 3 is a diagram that illustrates the circuit configuration of the bus switches 21a, 21b. The bus switches 21a, 21b are constituted by switches that include complementary metal oxide semiconductors (CMOS) 211, 212, which data signals are input to and output from, and buffers 213, 214, which feed on/off control signals to their gates in accordance with the energy-saving signal 22.

The CMOSs 211, 212 have low power consumption and, without degrading a propagation delay time, can connect/separate (disconnect) the bus. The bus is connected/separated (disconnected) by the CMOSs 211, 212 so that the bus switches 21a, 21b perform the connection/separation (disconnection) in accordance with a control signal (the energy-saving signal 22 in the present embodiment), and if the control signal is set to a low (L) level, electrical continuity is established (on) and, if the control signal is set to a high (H) level, the electrical continuity is broken (off).

Because of the use of the bus switches 21a, 21b with such a structure, the energy-saving signal 22 is set to L during the normal mode and the switches establish the electrical continuity, whereby data transaction between the controller board 11 and the FAX controller board 13 is allowed, and the energy-saving signal 22 is set to H during the energy-saving mode and the switches break the electrical continuity, whereby the data path between the controller board 11 and the FAX controller board 13 is disconnected. Because the energy-saving signal 22 is set to L upon the power-on of the image forming apparatus, a problem of impossible data communication does not occur upon the power-on.

Figure 4:
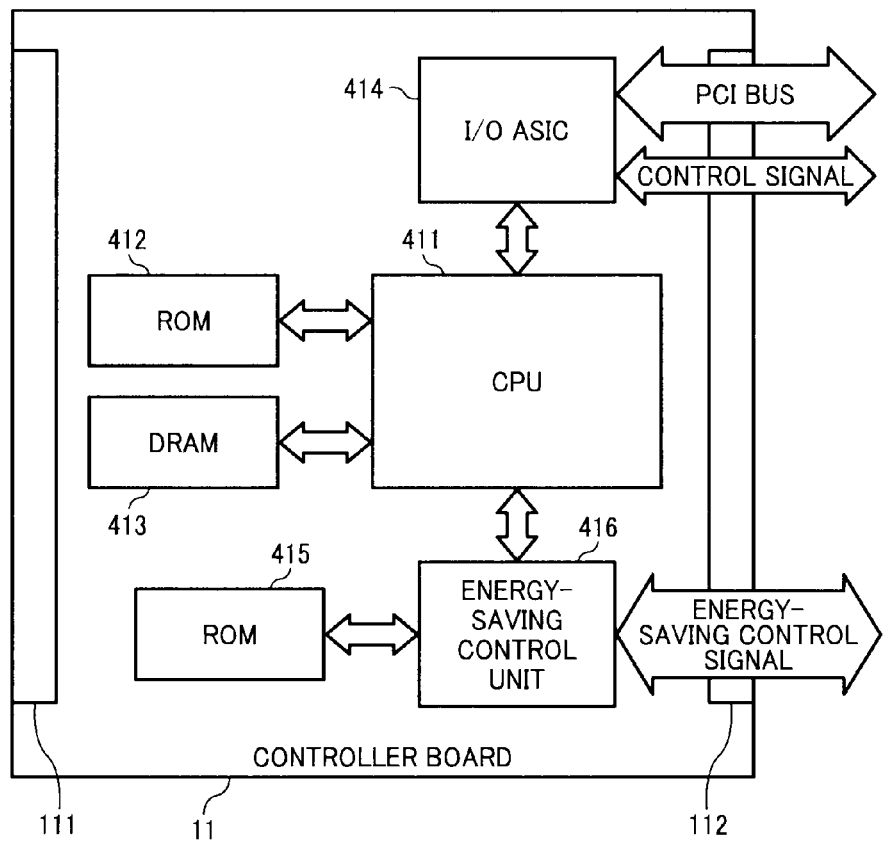
FIG. 4 is a block diagram of a controller board.

FIG. 4 is a block diagram that illustrates the configuration of the controller board 11. As shown in FIG. 4, the controller board 11 mainly includes a CPU 411, ROMs 412, 415, a DRAM 413, an I/O ASIC 414, and an energy-saving control unit 416.

The I/O ASIC 414 is an ASIC that controls the PCI bus. The DRAM 413 functions as a working memory of a system program. The ROM 415 is a storage medium that stores therein an energy-saving control program to be executed by a CPU (not illustrated) built in the energy-saving control unit 416. The energy-saving control unit 416 executes the energy-saving control program stored in the ROM 415 by using the built-in CPU, thereby perfuming the overall control during the energy-saving state. Specifically, the energy-saving control unit 416 is a System on Chip (SoC).

The image forming apparatus according to the present embodiment has, as the energy-saving modes if the FAX function is not provided as an option, the stand-by mode, the engine-off mode, and the STR mode. The stand-by mode is a mode in which, although the current is applied to the entire apparatus including the engine board 14, an operation is not performed, and the engine-off mode is a mode in which, although the power of the engine board 14 is turned off, the current is applied to the controller board 11. Moreover, the STR mode is a mode in which the power of the engine board 14 is turned off and, with respect to the controller board 11, the power of the CPU 411 is turned off and the current is applied to only some ICs, for example, an IC for network control, and the like, rather than the CPU. The energy-saving control unit 416 controls some ICs (including the bus switches 21a, 21b of the relay board 12) to which the current is applied if the power of the CPU is turned off during the STR mode.

Figure 5:
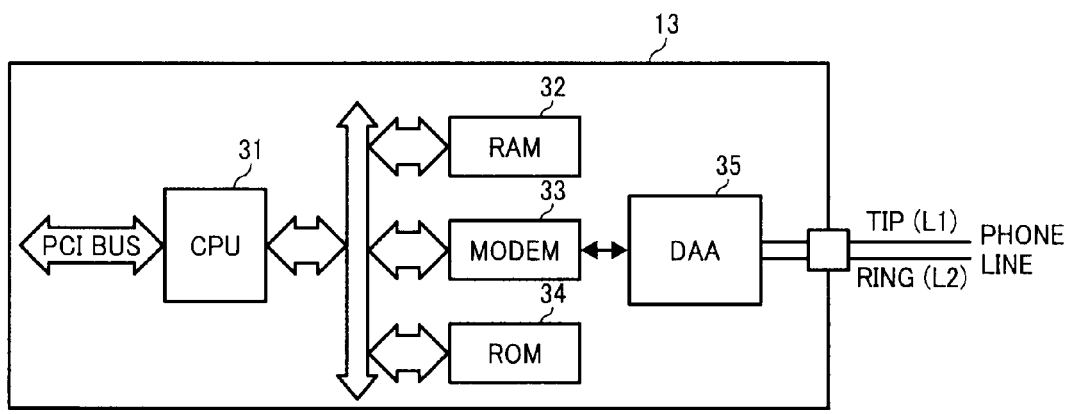
FIG. 5 is a block diagram of a FAX controller board.

FIG. 5 is a block diagram that illustrates the configuration of the FAX controller board 13. The FAX controller board 13 includes a CPU 31, a RAM 32, a modem 33, a ROM 34, and a data access arrangement (DAA) 35. The CPU 31, the RAM 32, the modem 33, and the ROM 34 are connected to one another via a bus. The DAA 35 is connected to the modem 33 and a phone line. Moreover, the CPU 31 is connected to a PCI bus.

Figure 13:
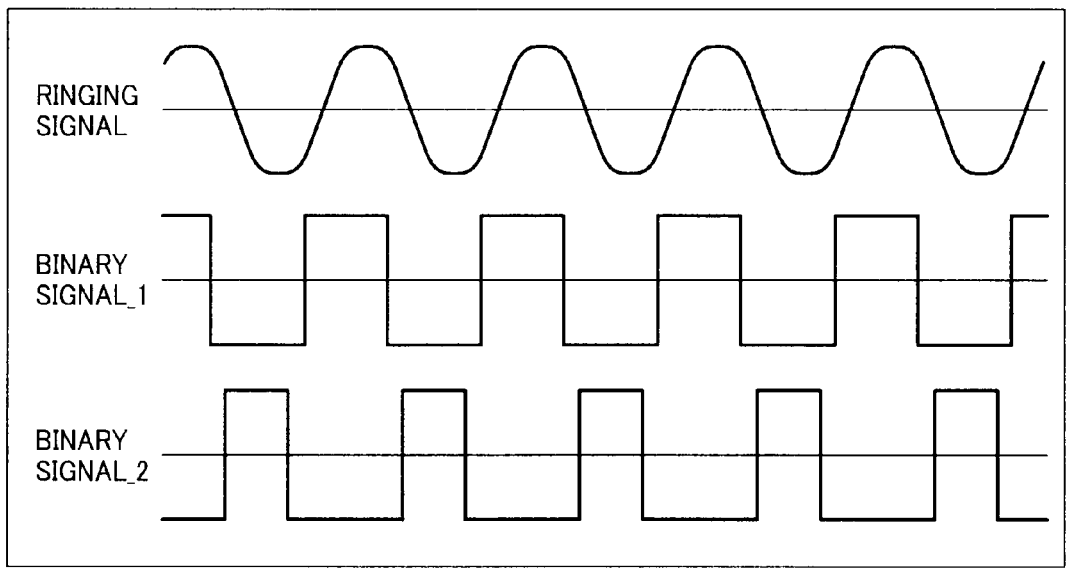
FIG. 13 is a diagram illustrating waveforms of binary signals if a ringing signal is a sine wave.
Figure 14:
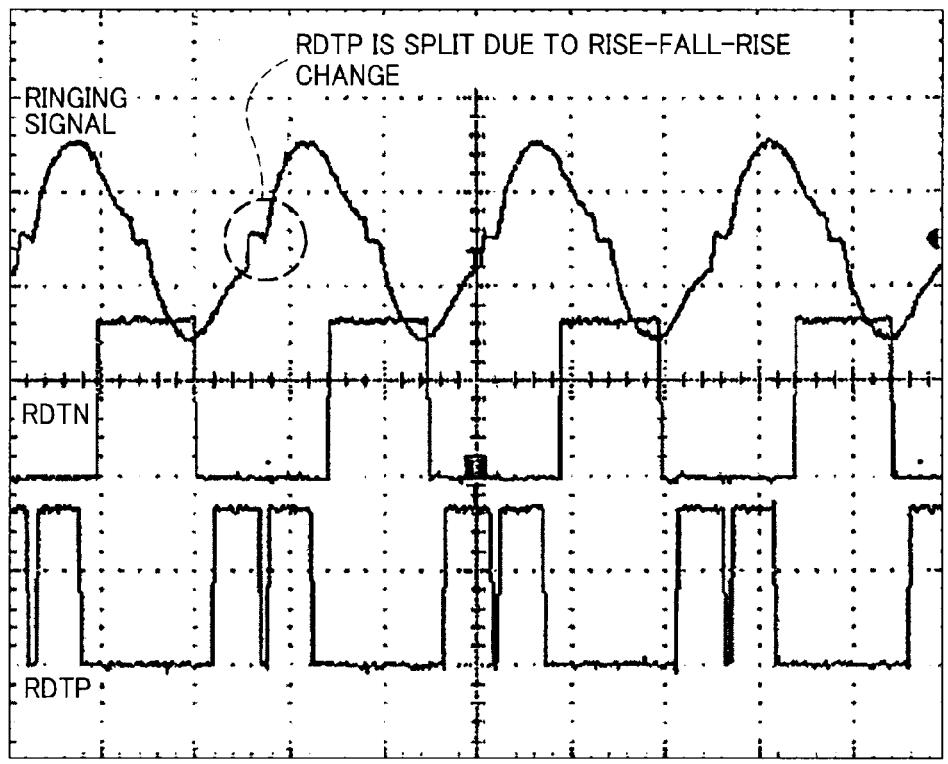
FIG. 14 is a diagram illustrating a state in which the waveform of the binary signal on the positive side is split due to the distortion of the ringing signal.
Figure 15:
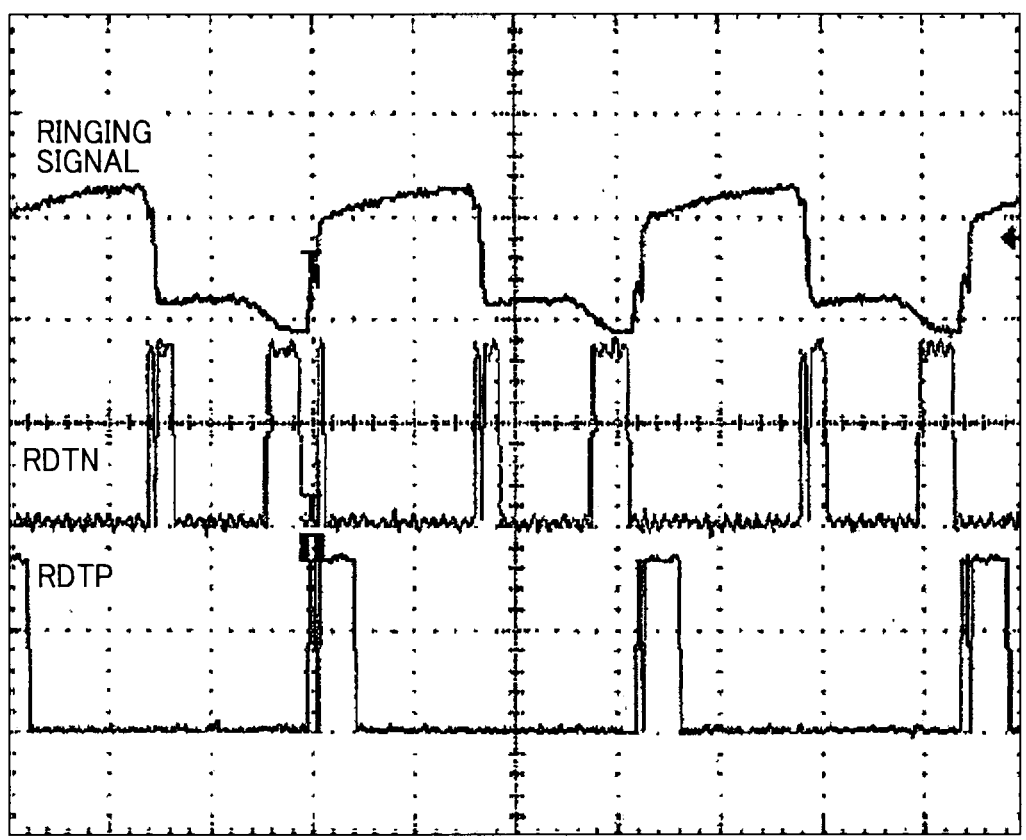
FIG. 15 is a diagram illustrating a state in which the waveforms of the binary signals on both the positive and negative sides are split due to the distortion of the ringing signal.

The CPU 31 controls the FAX controller board 13. The RAM 32 is a work area where various types of data and programs are temporarily stored when the CPU 31 is in operation. The modem 33 modulates/demodulates data (image data, various types of protocol data) with respect to the phone line. Various types of programs and fixed data to be executed by the CPU 31 are stored in the ROM 34. The DAA 35 includes a ringing-signal detecting circuit that detects a ringing signal from the phone line and outputs it to the modem 33. The operation of the ringing-signal detecting circuit is the same as that of the conventional apparatus shown in FIG. 13.

As shown in FIG. 1, if the power of the CPU 31 of the FAX controller board 13 is turned off when the apparatus enters the STR mode in a state in which the FAX controller board 13 is connected so that the power of the CPU of the controller board 11 is turned off, the control of the detection frequency cannot be performed by the software of the CPU 31 of the FAX controller board 13 and the detection frequency depends on the capability of the DAA 35; therefore, there is a possibility that the ringing signal is not recognized as a ringing signal and the FAX communication cannot be performed with a caller.

Therefore, in the present embodiment, the power of the CPU 31 of the FAX controller board 13 is not turned off during the STR mode, and the energy-saving signal 22 is set to the H level so that the bus switches 21a, 21b are turned off, whereby the PCI bus on the relay board 12 is disconnected. As a result, because the PCI bus between the controller board 11 and the FAX controller board 13 is disconnected, the through current does not flow from the CPU 31 of the FAX controller board 13 into the controller board 11.

Thus, the bus switches 21a, 21b are added to the PCI bus on the relay board 12 and the PCI bus is disconnected during the STR mode, whereby it is possible to put the controller board 11 into the energy-saving state and the FAX controller board 13 into the current-carrying state (normal state).

If the controller board 11 is to recover from the STR mode to the normal state in accordance with a FAX communication request from the outside, when the DAA 35 on the FAX controller board 13 detects a ringing signal, the CPU 31 generates a recovery signal 23 and sends the recovery signal 23 to the relay board 12 via the connector 131, whereby the recovery signal 23 is sent to the connector 121 via a signal line that is different from the PCI bus on the relay board 12 and then the recovery signal 23 is sent to the controller board 11. When the controller board 11 recovers to the normal state, the energy-saving signal 22 is set to L so that the bus switches 21a, 21b establish electrical continuity, whereby the FAX controller board 13 and the controller board 11 are connected to each other via the PCI bus via the relay board 12.

Although the case is explained above where the controller board 11 recovers to the normal state if the ringing signal from the phone line is detected, if a specified-time transmission is set in a timer within the FAX controller board 13, the recovery signal 23 is output to the controller board 11 when the time is up so that the controller board 11 can recover to the normal state.

Thus, with the image forming apparatus according to the first embodiment, the PCI bus is disconnected by the bus switches 21a, 21b on the relay board 12 during the STR mode even in a state in which the FAX controller board 13 is connected, which is an option that cannot shift to the energy-saving state, whereby the controller board 11 enters the energy-saving state and the FAX controller board 13 enters the current-carrying state (normal state). Therefore, even if the controller board 11 is in the energy-saving state, the FAX controller board 13 can detect a ringing signal from the outside and it is possible to prevent the through current from flowing into the controller board 11. Specifically, the power consumption is reduced from 16.1 Wh to 3.2 Wh, as measured by an actual apparatus, when the controller board 11 is in the energy-saving state. The power consumption is 9.1 Wh, as measured by the previously used apparatus. Conventionally, it is not assumed that an option board that cannot shift to the energy-saving state is connected; however, such an option board can be connected. Furthermore, it is possible to recover the controller board 11 to the normal state by a recovery factor of the FAX controller board 13.

There is no problem if the controller board 11, the relay board 12, the FAX controller board 13, and software thereof are all compatible with the STR mode; however, they can have different versions in reality. For example, in the case where the controller board 11 is compatible with the STR mode and the relay board 12 or the FAX controller board 13 is not compatible with the STR mode, if the FAX controller board 13 detects a ringing signal in a state in which the controller board 11 has shifted to the STR mode, the FAX controller board 13 cannot output the recovery signal 23; therefore, the controller board 11 cannot recover from the STR mode to the normal state and the FAX controller board 13 cannot start a FAX communication.

Figure 6:
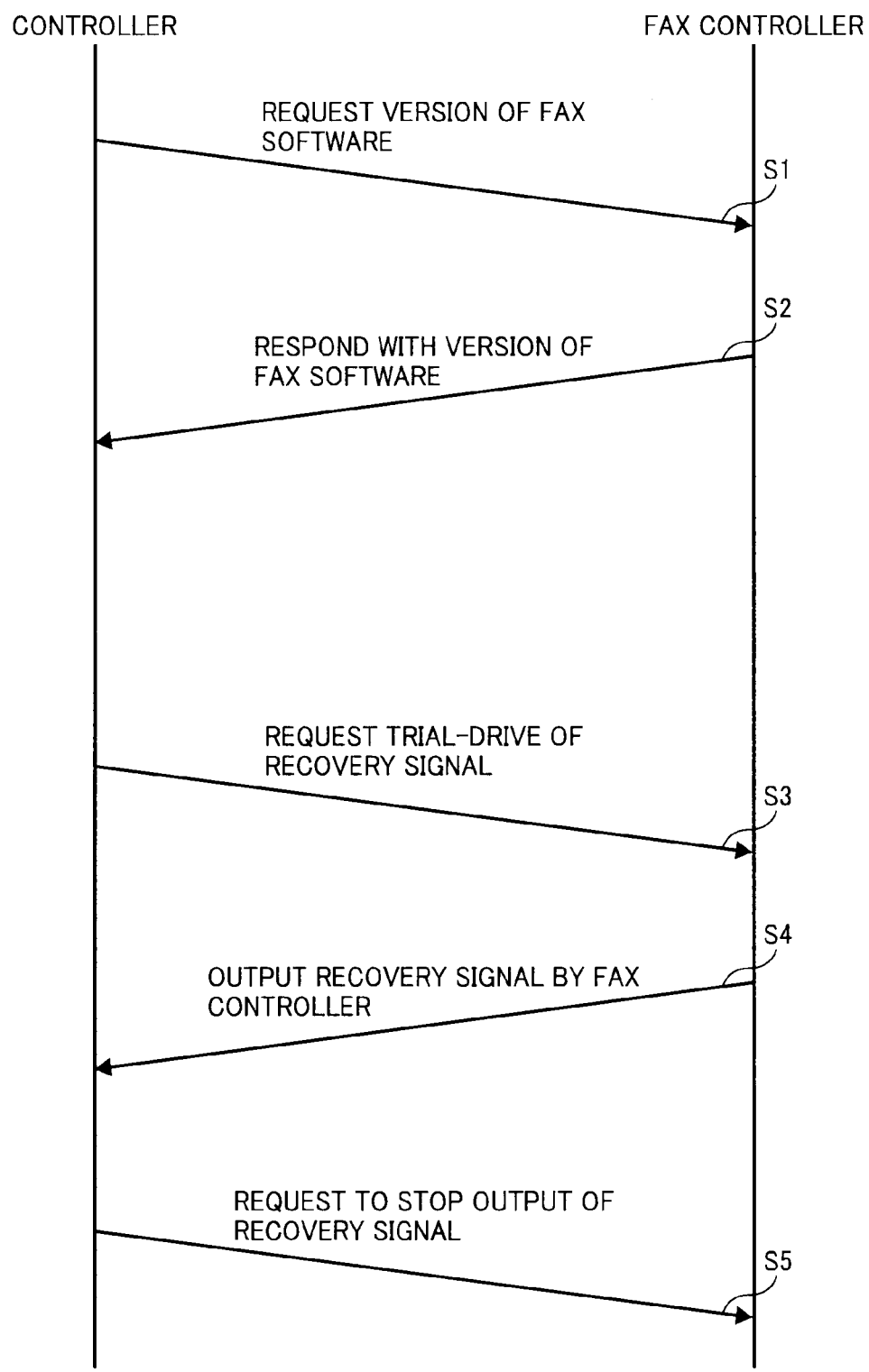
FIG. 6 is a sequence diagram showing a procedure for checking versions of the relay board, the FAX controller board, and software thereof according to a second embodiment of the present invention.

Therefore, in the present embodiment, the CPU of the controller board 11 has a function to check whether each of them has a version that is compatible with the STR mode. If the controller board 11 is not compatible with the STR mode, the controller board 11 does not shift to the STR mode; therefore, the above problem does not occur. The versions of the relay board 12, the FAX controller board 13, and the software thereof are checked by the process shown in FIG. 6 so that it is confirmed whether each of them is compatible with the STR mode.

First, the controller board 11 requests the version of the software (Step S1). At that time, the CPU 31 of the FAX controller board 13 has a function such that if the software is compatible with the STR mode, the FAX controller board 13 can respond with the version and, if the software is not compatible with the STR mode, the FAX controller board 13 does not respond.

If the controller board 11 receives the version response from the FAX controller board 13 (Step S2), the controller board 11 determines that the software with the version that allows the shift to the STR mode is implemented. Meanwhile, if the controller board 11 does not receive the version response from the FAX controller board 13 although a certain time has elapsed, the controller board 11 determines that the software of the FAX controller board 13 is software with a version that is not compatible with the STR mode. This process is performed so that it is determined whether the FAX controller board 13 and its software are compatible with the STR mode.

Next, the controller board 11 requests the FAX controller board 13 to output the recovery signal 23 as a trial in order to detect the version of the relay board 12 (Step S3).

The FAX controller board 13 outputs the recovery signal 23 (Step S4). At that time, if the relay board 12 is not compatible with the STR mode, that is, if a signal line for recovery signals is not present, the recovery signal 23 is not transmitted to the controller board 11; therefore, the controller board 11 cannot detect the recovery signal 23. Therefore, if the controller board 11 can detect the recovery signal 23 within a certain time, the controller board 11 determines that the relay board 12 is compatible with the STR mode, and conversely, if the controller board 11 cannot detect the recovery signal 23, the controller board 11 determines that the relay board 12 is not compatible with the STR mode. After this determination, the controller board 11 requests the FAX controller board 13 to stop outputting the recovery signal 23 (Step S5).

With an image forming apparatus according to a second embodiment of the present invention, because the controller board 11 controls whether an optionally connected board is compatible with the STR mode or not, if the optionally connected board is not compatible with the STR mode, the controller board 11 does not enter the STR mode. Therefore, it is possible to prevent the case where the controller board 11 enters the STR mode without permission and cannot recover to the normal mode.

Because the PCI bus has a negative logic, it is necessary to pull up the PCI bus with a pull-up voltage. Therefore, the PCI bus is pulled up on the controller board 11. In the first embodiment, the PCI bus on the FAX controller board 13 connected as an option is also pulled up with a pull-up voltage. However, if the PCI bus is disconnected by the bus switches 21a, 21b during the STR mode, the PCI bus line cannot be pulled up due to its high impedance.

Therefore, it is necessary to pull up the PCI bus on the side of the FAX controller board 13. However, if the PCI bus is also pulled up on the side of the FAX controller board 13, the PCI bus is pulled up on two positions during the normal mode, which causes voltage dividing. Furthermore, if the PCI bus is pulled up on the side of the FAX controller board 13 before the controller board 11 is started up upon the start-up of the apparatus, the through current flows into the IC of the controller board 11.

Therefore, in the image forming apparatus according to the present embodiment, a switch is arranged on the relay board 12 so that the PCI bus is also pulled up on the side of the FAX controller board 13 and the pull-up voltage does not rise on the side of the FAX controller board 13 from when the apparatus is started up to when it shifts to the STR mode.

Figure 7:
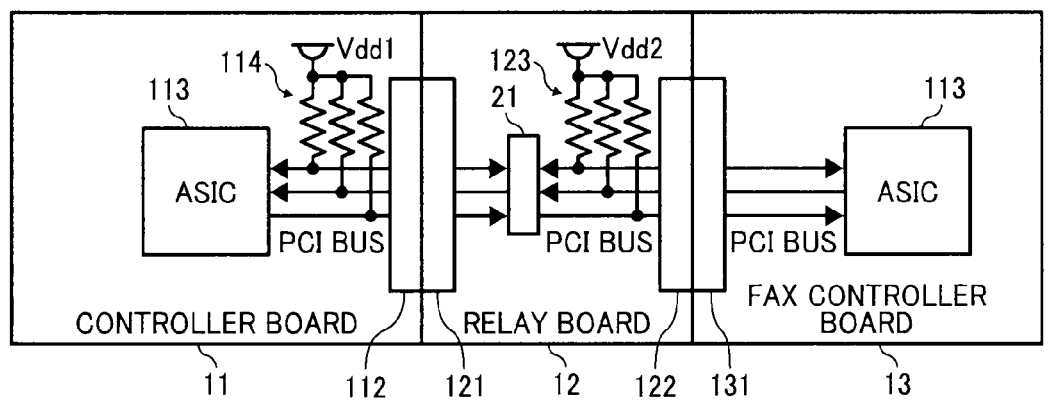
FIG. 7 is a diagram illustrating the circuit configuration to pull up a PCI bus according to a third embodiment of the present invention.

FIG. 7 is a diagram that illustrates the circuit configuration to pull up the PCI bus in the image forming apparatus according to the present embodiment. As shown in the figure, the PCI bus that connects the connector 112 to an ASIC 113 on the controller board 11 is pulled up to power Vdd1 by a pull-up resistor 114. Moreover, on the relay board 12, with respect to the disconnecting/connecting unit 21 (the bus switches 21a, 21b), the PCI bus (the PCI bus that connects the connector 122 to the bus switches 21a, 21b) on the side of the FAX controller board 13 is pulled up to power Vdd2 by a pull-up resistor 123.

Figure 8:
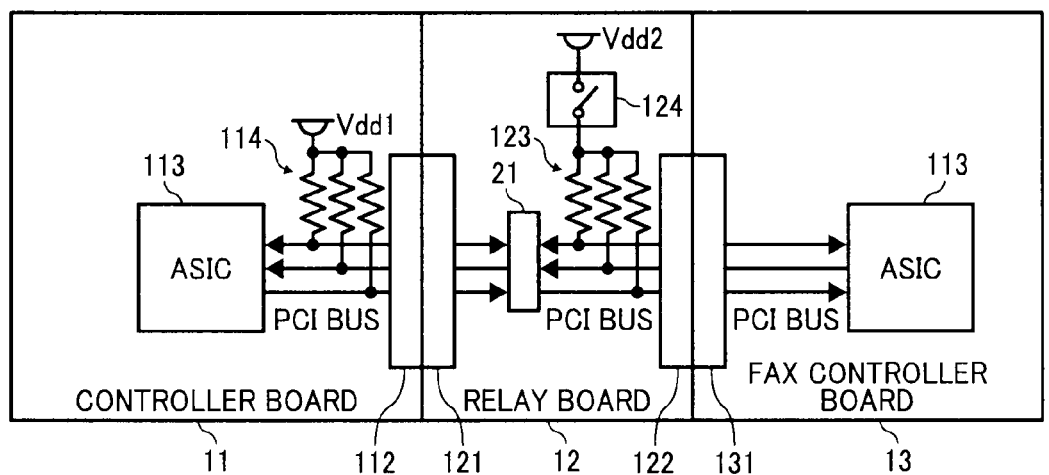
FIG. 8 is a diagram illustrating a different circuit configuration to pull up the PCI bus according to the third embodiment.

Furthermore, as shown in FIG. 8, it is possible to configure such that a switch 124 constituted by a CMOS, or the like, is arranged in series to the pull-up resistor 123 and the pulling-up is turned on/off by the switch 124. In this case, the switch 124 is turned off from when the apparatus is started up to when it shifts to the STR mode. Specifically, for example, when the energy-saving signal 22 is set to L, the switch is turned off and, if the energy-saving signal 22 is set to H, the switch is turned on.

With such a configuration, it is possible that the pull-up voltage on the side of the FAX controller board 13 is prevented from rising from when the apparatus is started up to when it shifts to the STR mode, whereby the through current is prevented from flowing into the IC of the controller board 11, and the PCI bus on the FAX controller board 13 is pulled up by the pull-up resistor 123 on the relay board 12 during the STR mode.

According to a third embodiment of the present invention, the pull-up means is also arranged on the relay board 12 so that, if the controller board 11 and the FAX controller board 13 are disconnected from each other due to the shift to the STR mode, the PCI bus on the FAX controller board 13 can be pulled up. Moreover, the timing of the pulling-up of the PCI bus on the relay board 12 is controlled so that it is possible to prevent the through current flowing into the controller board 11 and the voltage dividing.

If the rise timing of the CPU 31 of the FAX controller board 13 is faster than the rise timing of the pull-up voltage, the power is first applied to an I/O port of the PCI bus of the CPU 31, whereby the through current flows into the controller board 11. Therefore, the rise timing of the power of the FAX controller board 13 needs to be later than the rise timing of the pull-up voltage. If the controller board 11 is in the normal state, the rise can be controlled by using a control signal from the controller board 11; however, if the controller board 11 shifts to the STR mode, the control signal from the controller board 11 falls, whereby the power voltage of the FAX controller board 13 falls.

Figure 9:
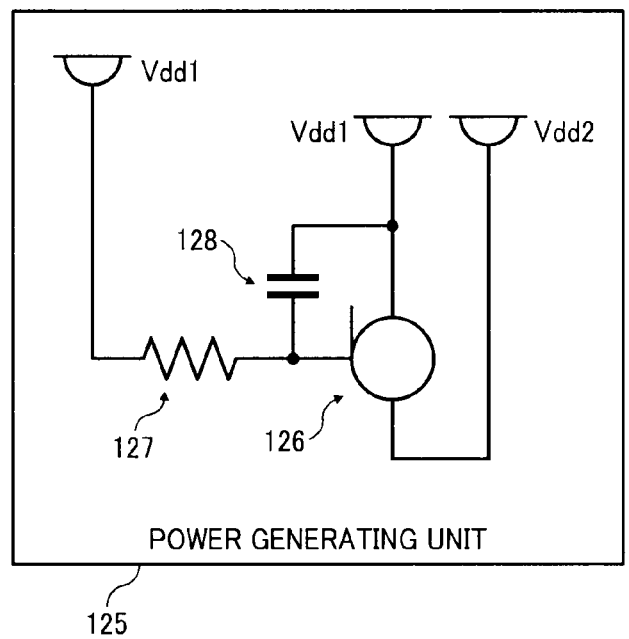
FIG. 9 is a circuit configuration diagram of a power generating unit according to a fourth embodiment of the present invention.

According to a fourth embodiment of the present invention, the rise time is controlled with hardware by using a Field Effect Transistor (FET) and the RC time constant on the relay board 12. FIG. 9 is a circuit configuration diagram of a power generating unit 125 that controls such a rise time. The power generating unit 125 is a circuit that generates the power (Vdd2) to be supplied to the FAX controller board 13 and is arranged on the relay board 12. An FET 126 has a function as a switch that generates the Vdd2. In the power generating unit 125 according to the present embodiment, the power rise timing of the FAX controller board 13 is controlled by using the FET 126 and the RC time constant of a resistance R of a resistor 127 and a capacitance C of a capacitor 128.

Figure 10:
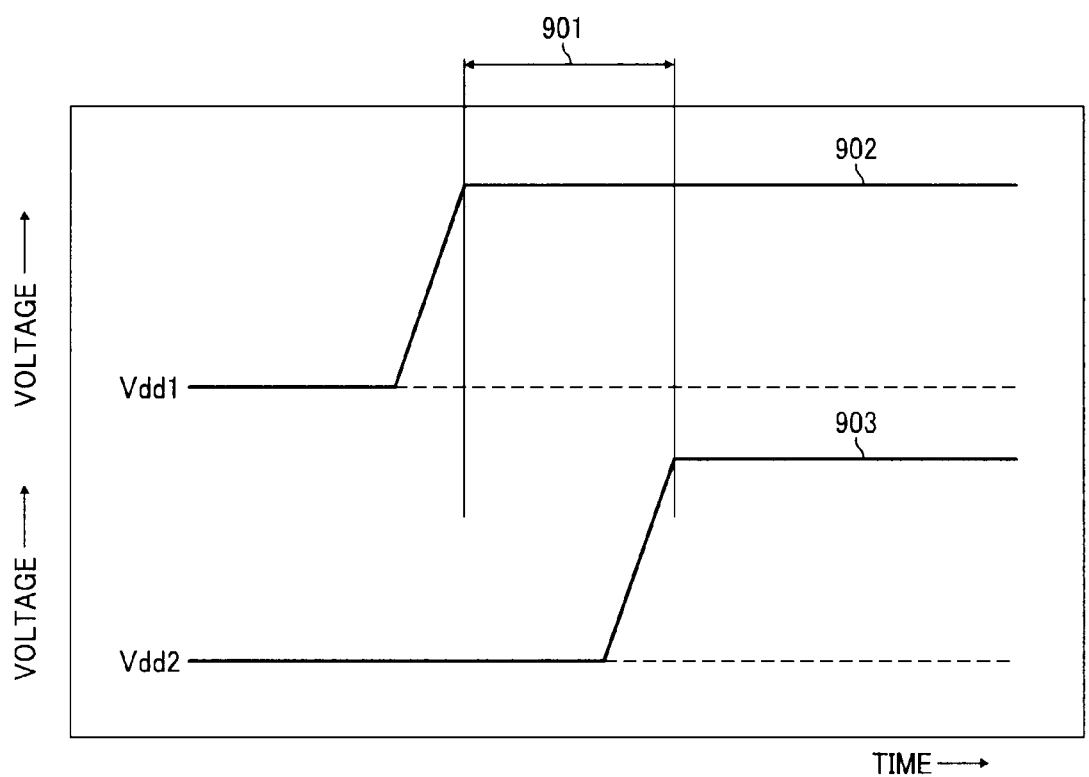
FIG. 10 is a timing chart of the power rise timing of a controller board and the power rise timing of the FAX controller board.

FIG. 10 is a timing chart that illustrates the power rise timing of the controller board 11 and the power rise timing of the FAX controller board 13. As shown in FIG. 10, the Vdd1 is the power voltage of the controller board 11, and the reference numeral 902 indicates the waveform of the power rise of the controller board 11. Furthermore, the Vdd2 is the power voltage of the FAX controller board 13, and the reference numeral 903 indicates the waveform of the power rise of the FAX controller board 13. As shown in FIG. 10, the power generating unit 125 of the relay board 12 causes the power rise timing of the FAX controller board 13 to be delayed by a time difference 901 relative to the power rise timing of the controller board 11.

Thus, in the present embodiment, the power rise is controlled by, rather than the control signal from the controller board 11, the hardware on the relay board 12 such that the power rise occurs later than the rise of the pull-up voltage, whereby even if the controller board 11 enters the energy-saving state, it is possible to cause the power voltage of the FAX controller board 13 to keep rising.

Although the relay board 12 has the function to connect/disconnect the PCI bus in the first to fourth embodiments, a FAX controller board has the function to connect/disconnect the PCI bus in a fifth embodiment of the present invention.

Figure 11:
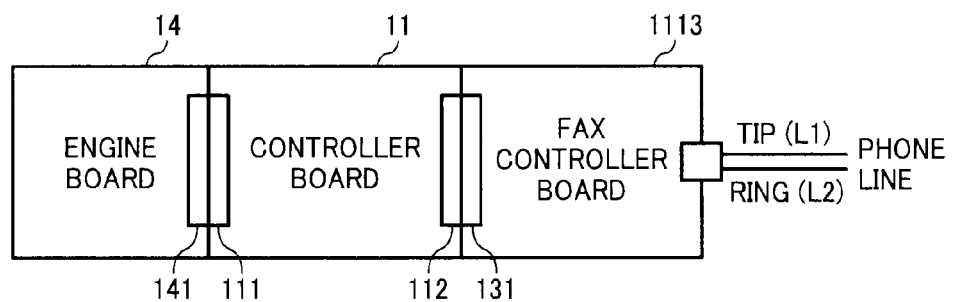
FIG. 11 is a diagram illustrating boards that constitute an image forming apparatus according to a fifth embodiment of the present invention.

FIG. 11 is a diagram that illustrates boards that constitute an image forming apparatus that is an electronic apparatus according to the fifth embodiment. The image forming apparatus includes the controller board 11, a FAX controller board 1113, and the engine board 14, and the FAX controller board 1113 is connected to the controller board 11 without involving a relay board. The functions and configuration of the engine board 14 and the controller board 11 are the same as those in the first to fourth embodiments.

Figure 12:
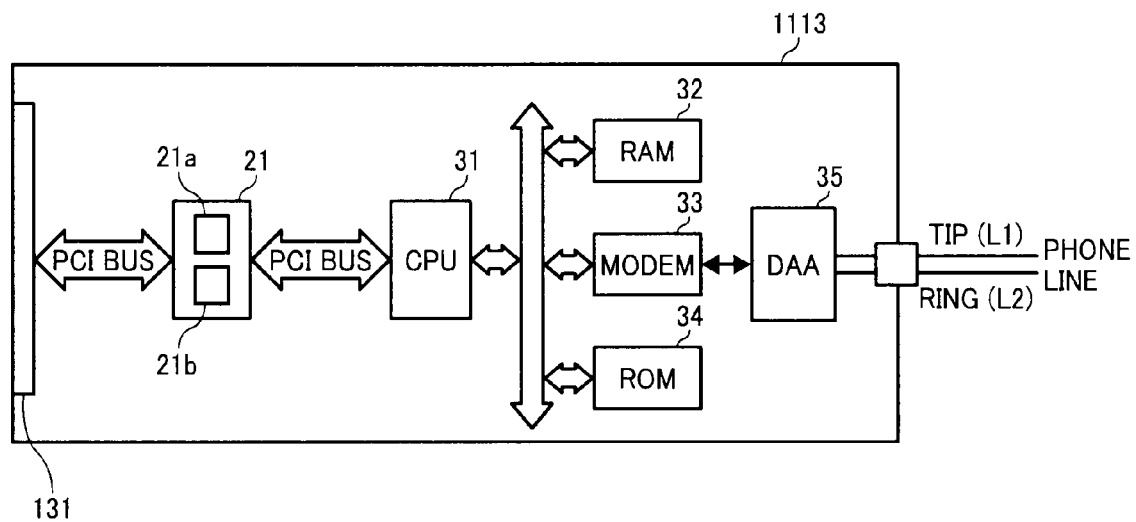
FIG. 12 is a block diagram of a FAX controller board according to the fifth embodiment.

FIG. 12 is a block diagram that illustrates the configuration of the FAX controller board according to the fifth embodiment. As shown in FIG. 12, the FAX controller board 1113 according to the present embodiment includes the CPU 31, the RAM 32, the modem 33, the ROM 34, the DAA 35, and the disconnecting/connecting unit 21. The functions of the CPU 31, the RAM 32, the modem 33, the ROM 34, and the DAA 35 are the same as those in the first to fourth embodiments.

The disconnecting/connecting unit 21 has the same functions and configuration as those of the disconnecting/connecting unit 21 arranged on the relay board according to the first embodiment and includes the bus switches 21a, 21b. The bus switches 21a, 21b are turned on/off so that the data path between the CPU 31 and the connector 131 can be disconnected/connected. The configuration of the bus switches 21a, 21b is the same as that described in the first embodiment with reference to FIGS. 2 and 3. Specifically, the bus switches are turned on/off so that signals flowing via the PCI bus between the CPU 31 and the connector 131 are interrupted or passed through. Concretely, if the energy-saving signal 22 fed from the controller board 11 is set to the low (L) level, the bus switches 21a, 21b establish electrical continuity (on) and, if it is set to the high (H) level, breaks the electrical continuity (off).

Because of the use of the bus switches 21a, 21b, the energy-saving signal 22 is set to L during the normal mode and the switches establish the electrical continuity, whereby data transaction between the controller board 11 and the FAX controller board 1113 is allowed, and the energy-saving signal 22 is set to H during the energy-saving mode and the switches break the electrical continuity, whereby the data path between the controller board 11 and the FAX controller board 1113 is disconnected. Thus, the same function as the relay board 12 according to the first embodiment is achieved by the disconnecting/connecting unit 21 on the FAX controller board 1113.

As described above, in the present embodiment, because the FAX controller board 1113 has the function to disconnect/connect the PCI bus, the same advantage as the first embodiment can be produced, and the relay board is not necessary, whereby the configuration can be simplified.

Although the example where the PCI bus is used as a bus is explained in the above embodiments, the present invention is not limited to this, and other buses such as a local bus can be used.

According to an aspect of the present invention, when a first board is in the energy-saving state and a second board is in the normal state, the through current does not flow from the second board to the first board; therefore, an advantage can be produced such that damage to the first board due to the through current flowing from the second board to the first board is prevented while the energy-saving of an apparatus is achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic apparatus comprising:
a first board that includes a first processor;
a second board that is connected to the first board with a bus, the second board including a second processor; and
a disconnecting/connecting unit that is provided on the bus between the first board and the second board, and that, when the first board is in a first state in which power of the first processor is turned off and the second board is in a second state in which power of the second processor is turned on, disconnects a signal supplied via the bus between the first board and the second board, wherein
the first board includes an energy-saving control unit that sends to the disconnecting/connecting unit a control signal while the first board is in the first state in which power of the first processor is turned off, and
the disconnecting/connecting unit includes a plurality of switches that are controlled by the control signal, which is sent from the energy-saving control unit of the first board, to disconnect the signal supplied via the bus between the first board and the second board.

2. The electronic apparatus according to claim 1, wherein, when both the first board and the second board are in the second state, the disconnecting/connecting unit connects the signal supplied via the bus between the first board and the second board.

3. The electronic apparatus according to claim 1, wherein the electronic apparatus includes a facsimile function,
the first board is a controller board that performs overall control of the electronic apparatus, and
the second board is a facsimile controller board that controls the facsimile function.

4. The electronic apparatus according to claim 3, wherein the second board includes
a detecting unit that detects a ringing signal from outside, and
a sending unit that sends, in response to a detection of the ringing signal, a recovery signal to the disconnecting/connecting unit for recovering the first board from the first state to the second state, and
the disconnecting/connecting unit includes a transferring unit that transfers received recovery signal to the first board via a signal line that is provided in separate manner from the bus.

5. The electronic apparatus according to claim 4, wherein the first board includes
a first determining unit that checks whether the second board has a function to send the recovery signal, and
a second determining unit that checks whether the disconnecting/connecting unit has a function to transfer the recovery signal.

6. The electronic apparatus according to claim 1, wherein the first board and the disconnecting/connecting unit include a pull-up unit that pulls up the bus.

7. The electronic apparatus according to claim 6, wherein the disconnecting/connecting unit includes a control unit that controls the pull-up unit to start an operation after the first board enters to the first state.

8. The electronic apparatus according to claim 1, further comprising a relay board that includes the disconnecting/ connecting unit and relays transmission of the signal via the bus between the first board and the second board.

9. The electronic apparatus according to claim 1, wherein
the disconnecting/connecting unit is included on a relay board that includes a first relay board connector and a second relay board connector,
the first board includes a first connector,
the second board includes a second connector, and
the first connector of the first board is connected to the first relay board connector, and the second connector of the second board is connected to the second relay board connector.

10. A method of disconnecting and connecting a signal in an electronic apparatus that includes a first board that includes a first processor and a second board that is connected to the first board with a bus and that includes a second processor, the method comprising:
disconnecting, by a disconnecting/connecting unit provided on the bus between the first board and the second board, when the first board is in a first state in which power of the first processor is turned off and the second board is in a second state in which power of the second processor is turned on, a signal supplied via the bus between the first board and the second board;
sending to the disconnecting/connecting unit, by an energy-saving control unit included on the first board, a control signal while the first board is in the first state in which power of the first processor is turned off; and
controlling by the control signal a plurality of switches included in the disconnecting/connecting unit to disconnect the signal supplied via the bus between the first board and the second board.

* * * * *